US008538631B2

(12) United States Patent
Lee et al.

(10) Patent No.: US 8,538,631 B2
(45) Date of Patent: Sep. 17, 2013

(54) METHOD AND SYSTEM FOR VEHICLE PARKING ASSISTANCE

(75) Inventors: Yong H. Lee, Troy, MI (US); Weiwen Deng, Rochester Hills, MI (US); Alexander Kade, Grosse Pointe Woods, MI (US); Yuen-Kwok Chin, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1536 days.

(21) Appl. No.: 11/625,909

(22) Filed: Jan. 23, 2007

(65) Prior Publication Data
US 2008/0177443 A1    Jul. 24, 2008

(51) Int. Cl.
G05D 1/00    (2006.01)
G06F 7/00    (2006.01)

(52) U.S. Cl.
USPC .................................... 701/41; 701/1

(58) Field of Classification Search
USPC .................... 701/41; 340/932.2, 903, 436
See application file for complete search history.

(56) References Cited

U.S. PATENT DOCUMENTS

| | | | | |
|---|---|---|---|---|
| 6,059,063 A * | 5/2000 | Shimizu et al. | ............... | 180/204 |
| 6,070,684 A * | 6/2000 | Shimizu et al. | ............... | 180/204 |
| 6,102,147 A * | 8/2000 | Shimizu et al. | ............... | 180/204 |
| 6,154,695 A * | 11/2000 | Shimizu et al. | ................. | 701/41 |
| 6,170,591 B1 * | 1/2001 | Sakai et al. | .................... | 180/204 |
| 6,223,847 B1 * | 5/2001 | Shimizu et al. | ............... | 180/204 |
| 6,275,754 B1 * | 8/2001 | Shimizu et al. | ................. | 701/41 |
| 6,356,828 B1 * | 3/2002 | Shimizu et al. | .................. | 701/41 |
| 6,424,895 B1 * | 7/2002 | Shimizu et al. | .................. | 701/41 |
| 6,476,730 B2 | 11/2002 | Kakinami et al. | | |
| 6,483,442 B2 * | 11/2002 | Shimizu et al. | ............ | 340/932.2 |
| 6,487,481 B2 * | 11/2002 | Tanaka et al. | .................... | 701/41 |
| 6,587,760 B2 * | 7/2003 | Okamoto | .......................... | 701/1 |
| 6,621,421 B2 * | 9/2003 | Kuriya et al. | ............. | 340/932.2 |
| 6,657,555 B2 * | 12/2003 | Shimizu et al. | ............. | 340/932.2 |
| 6,778,891 B2 * | 8/2004 | Tanaka et al. | .................... | 701/41 |
| 6,820,711 B2 * | 11/2004 | Yamada et al. | ............... | 180/204 |
| 6,825,880 B2 * | 11/2004 | Asahi et al. | ............. | 348/333.02 |
| 6,898,527 B2 | 5/2005 | Kimura et al. | | |
| 6,919,822 B2 * | 7/2005 | Tanaka et al. | ............. | 340/932.2 |
| 6,925,370 B2 * | 8/2005 | Smith et al. | ..................... | 701/36 |
| 6,929,082 B2 * | 8/2005 | Kataoka et al. | ............... | 180/204 |
| 9,925,370 | 8/2005 | Smith, at al | | |
| 6,999,002 B2 * | 2/2006 | Mizusawa et al. | ......... | 340/932.2 |
| 7,012,550 B2 * | 3/2006 | Iwakiri et al. | ............. | 340/932.2 |

(Continued)

OTHER PUBLICATIONS

Klier, W., Concept and Functionality of the Active Front Steering System; SAE Tech. Paper 2004-21-0073, SAE, Warrendale, PA, USA.

Primary Examiner — Ian Jen

(57) ABSTRACT

A method to assist steering of a vehicle equipped with an active steering system when operating in a reverse direction is provided. The method comprises monitoring vehicle operating characteristics and an operator steering input. Boundaries of a target region and a reference point are determined. A target steering angle range is calculated based upon the reference point and the target location. A controlled steering angle of the active steering system is corrected when the operator steering input is outside the target steering angle range. An aspect of the invention included determining the reference point comprising a point of intersection of a first vector and a second vector, the first vector parallel to and passing through a centerline of a rear axle of the vehicle and the second vector perpendicular to and passing through a centerline of an inside front steerable wheel of the vehicle.

15 Claims, 9 Drawing Sheets

(56) References Cited

U.S. PATENT DOCUMENTS

| | | | |
|---|---|---|---|
| 7,085,634 B2 * | 8/2006 | Endo et al. | 701/36 |
| 7,089,101 B2 * | 8/2006 | Fischer et al. | 701/41 |
| 7,117,073 B2 * | 10/2006 | Endo et al. | 701/28 |
| 7,127,339 B2 * | 10/2006 | Iwazaki et al. | 701/36 |
| 2004/0020699 A1 | 2/2004 | Zalila et al. | |
| 2005/0027414 A1 * | 2/2005 | Iwazaki et al. | 701/36 |
| 2005/0049767 A1 * | 3/2005 | Endo et al. | 701/36 |
| 2005/0236201 A1 * | 10/2005 | Spannheimer et al. | 180/204 |
| 2005/0273236 A1 * | 12/2005 | Mori et al. | 701/41 |
| 2006/0052201 A1 | 3/2006 | Augustine et al. | |
| 2006/0113119 A1 * | 6/2006 | Dudeck et al. | 180/6.2 |
| 2008/0177443 A1 * | 7/2008 | Lee et al. | 701/41 |

* cited by examiner

Dimensions of Illustrative Vehicle

| Total Vehicle Length | 4.864 (m) |
|---|---|
| $L$ | 2.885 (m) |
| $L_f$ | 0.920 (m) |
| $L_r$ | 1.059 (m) |
| $T$ | 1.650 (m) |

METHOD AND SYSTEM FOR VEHICLE PARKING ASSISTANCE

TECHNICAL FIELD

This invention pertains generally to vehicle control systems, and more specifically to assisting a parking operation.

BACKGROUND OF THE INVENTION

Vehicle parking presents challenges for vehicle operators, stemming from issues related to vehicle size and physical dimensions of the vehicle and a targeted parking space, operator skill, area in which the operator wants to place the vehicle, and the type of parking maneuver contemplated.

A parking assistance system includes identifying a desired parking location, and assisting the operator in placing the vehicle in the desired location by controlling aspects of vehicle operation. Such a system is now described.

SUMMARY OF THE INVENTION

In accordance with an embodiment of the invention, there is provided a method to assist steering of a vehicle equipped with an active steering system when operating in a reverse direction. The method comprises monitoring vehicle operating characteristics and an operator steering input. Boundaries of a target region and a reference point are determined. A target steering angle range is calculated based upon the reference point and the target location. A controlled steering angle of the active steering system is corrected when the operator steering input is outside the target steering angle range. An aspect of the invention included determining the reference point comprising a point of intersection of a first vector and a second vector, the first vector parallel to and passing through a centerline of a rear axle of the vehicle and the second vector perpendicular to and passing through a centerline of an inside front steerable wheel of the vehicle.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the embodiments of which are described in detail and illustrated in the accompanying drawings which form a part hereof, and wherein.

DETAILED DESCRIPTION OF EMBODIMENTS OF THE INVENTION

Figure 1:
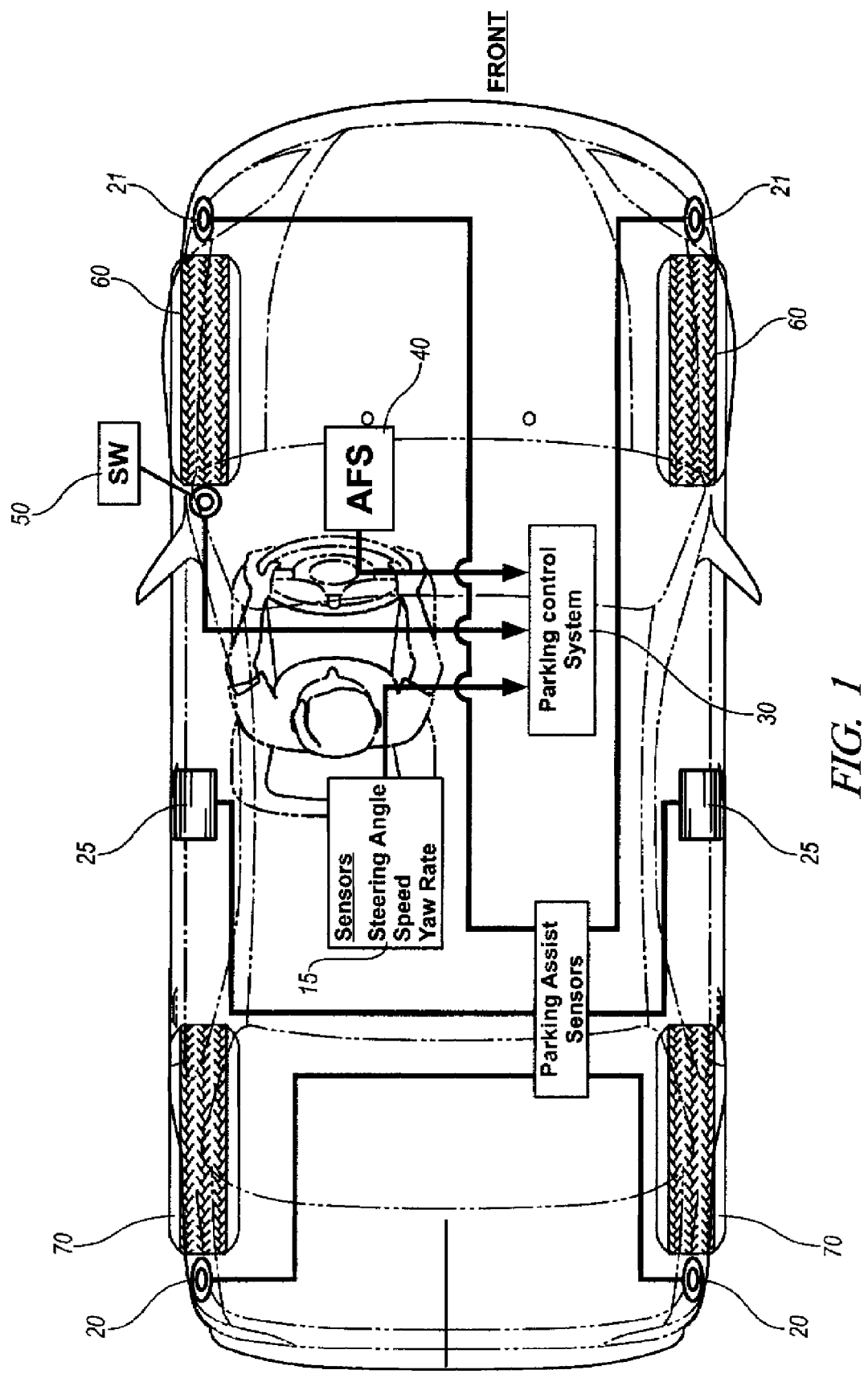
FIG. 1 comprises a schematic diagram of an exemplary vehicle, in accordance with the present invention.

Referring now to the drawings, wherein the showings are for the purpose of illustrating the invention only and not for the purpose of limiting the same, FIG. 1 comprises a vehicle system that has been mechanized in accordance with an embodiment of the invention. The vehicle illustrated comprises a conventional four-wheel passenger vehicle with steerable front wheels 60 and fixed rear wheels 70, although the invention is not so limited. The vehicle is equipped with parking assist sensors, comprising front corner sensors 21, rear corner sensors 20, and side sensors 25. The parking assist sensors 21, 20, 25 comprise devices operative to detect objects in a manner to determine a linear range thereto, including, e.g., ultrasound sensors, vision sensors, infrared devices, LIDAR devices, and radar devices. The parking assist sensors provide signal inputs to a parking control system 30. The vehicle is further equipped with a plurality of chassis monitoring sensing systems or devices 15 operative to monitor vehicle speed, steering angle and yaw rate, and typically comprising a yaw rate sensor, a lateral acceleration sensor, a steering angle sensor, and a vehicle speed sensor. There is a steering wheel angle sensor (not shown) operative to monitor operator input to steering via the steering wheel. The chassis monitoring sensors provide signal inputs to the parking control system 30, and to other vehicle control systems for vehicle control and operation. The vehicle is equipped with an active front steering system (AFS) 40 effective to augment operator input through the steering wheel by controlling steering angle of the steerable wheels 60. Active front steering systems 40 are known, and not described in detail, although specific aspects of active steering control are described and emphasized herein. The AFS system 40 permits primary steering operation by the vehicle operator with the parking control system augmenting steering wheel angle control when necessary. Alternate embodiments employing various steering-assistance systems are applicable so long as steering angle and/or vehicle yaw angle can be controlled. The control methods described herein are applicable with modifications, to vehicle steering control systems such as electrical power steering, four/rear wheel steering systems, and direct yaw control systems which control traction of each wheel to generate a yaw motion.

Figure 2:
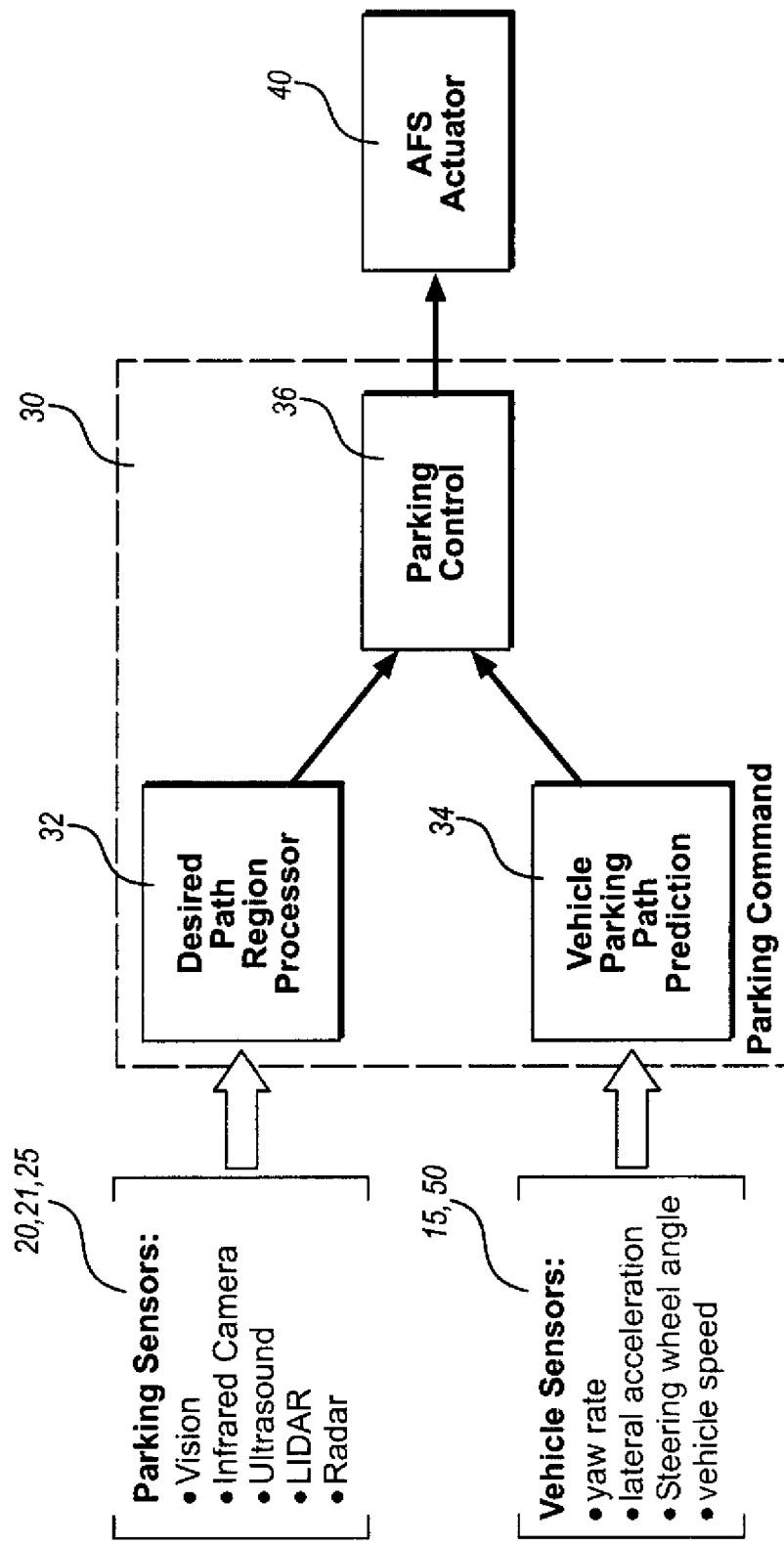
FIG. 2 comprises a schematic control diagram, in accordance with the present invention.

Referring now to FIG. 2, an overall control scheme to assist steering the exemplary vehicle is described. In operation, the parking assist sensors provide signal inputs to a first control module 32 of the parking control system 30 adapted to determine a desired parking path and parking region, the output of which comprises boundaries for a target parking region is input to a parking control module 36. The chassis monitoring sensors 15 provide signal inputs to a second control module 34 adapted to predict a vehicle parking path, which is input to the parking control module 36. The parking control module 36 is adapted to control vehicle steering to keep the vehicle within the boundaries of target parking region 80 by actively controlling one or more actuators of the AFS system 40.

In operation, the parking control scheme detects an operator intent to park the vehicle using either a parallel parking maneuver or a rear parking maneuver ('Parking Command'). Detection of the operator intent to park can be through an interactive notification system, e.g., a parking switch, wherein the operator notifies the control module of an intent to park using a user interface in the passenger compartment. Alternatively, the control system may detect an intent to park through a passive system, wherein the control module detects an intent to park by vehicle operation, e.g., a vehicle-stopping maneuver followed by a shift into a reverse transmission gear. Data accumulated by the parking assist sensors are processed through the first control module 32 to determine boundaries of the target parking region 80, and desired range of steering angle command is generated based thereon. The vehicle operator executes a parking maneuver, and when the steering wheel angle used by the operator is effective to place the vehicle within the allowable parking space geometry, there is no steering correction. When the operator input to steering angle falls outside the boundary, or the vehicle is projected to move out of the desired region based upon a vehicle trajectory, the parking control module 36 controls the AFS system 40 to adjust vehicle steering angle to place the vehicle within the boundaries of the target parking region 80, such steering angle correction preferably being limited and relatively nonintrusive. Furthermore, the first control module is continually monitoring and updating the boundaries of the target parking region 80. Therefore, if a new object is detected during the parking maneuver, the parking control system can respond to and accommodate it.

Figure 3:
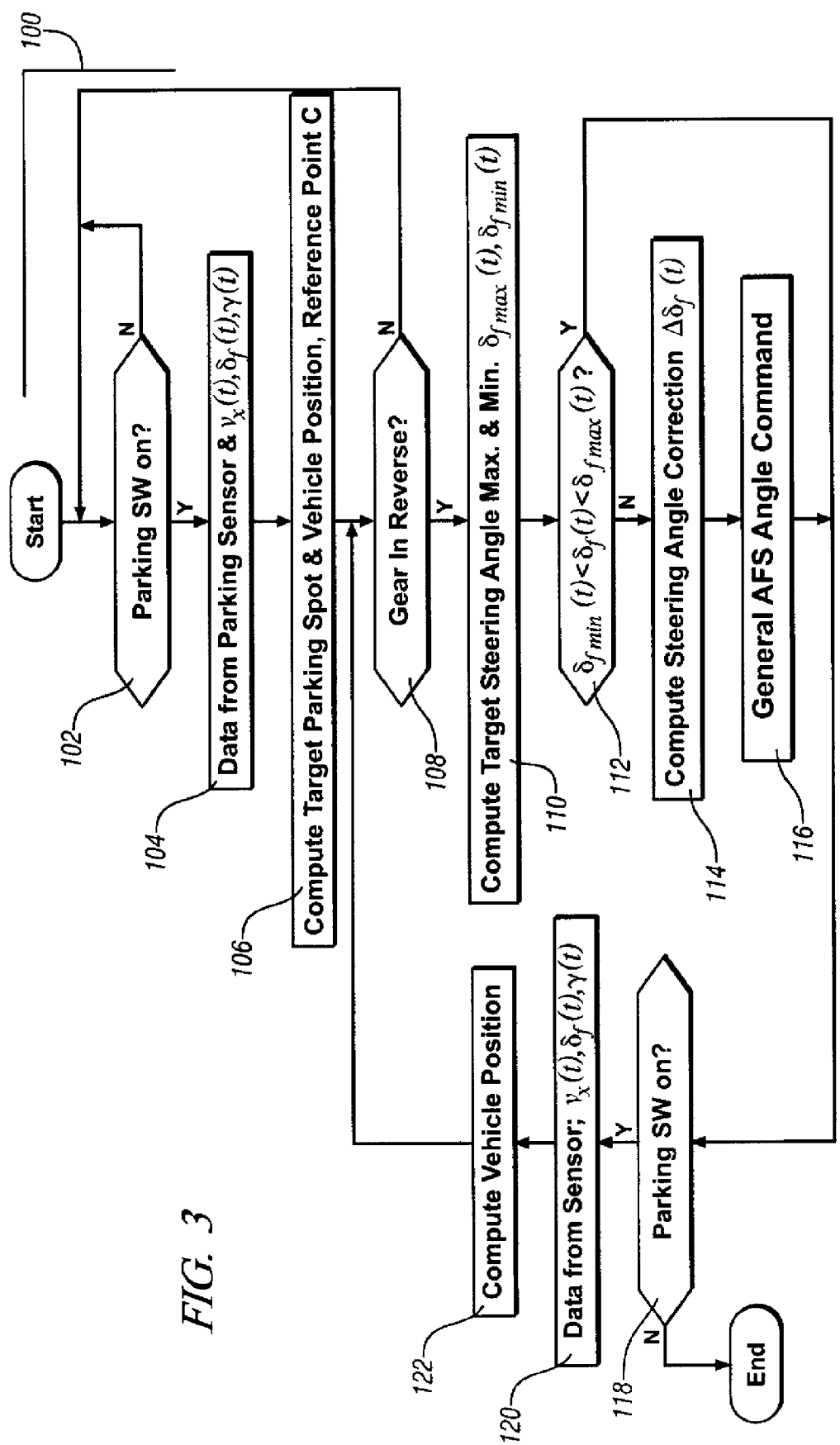
FIG. 3 comprises an algorithmic flowchart, in accordance with the present invention.
Figure 4:
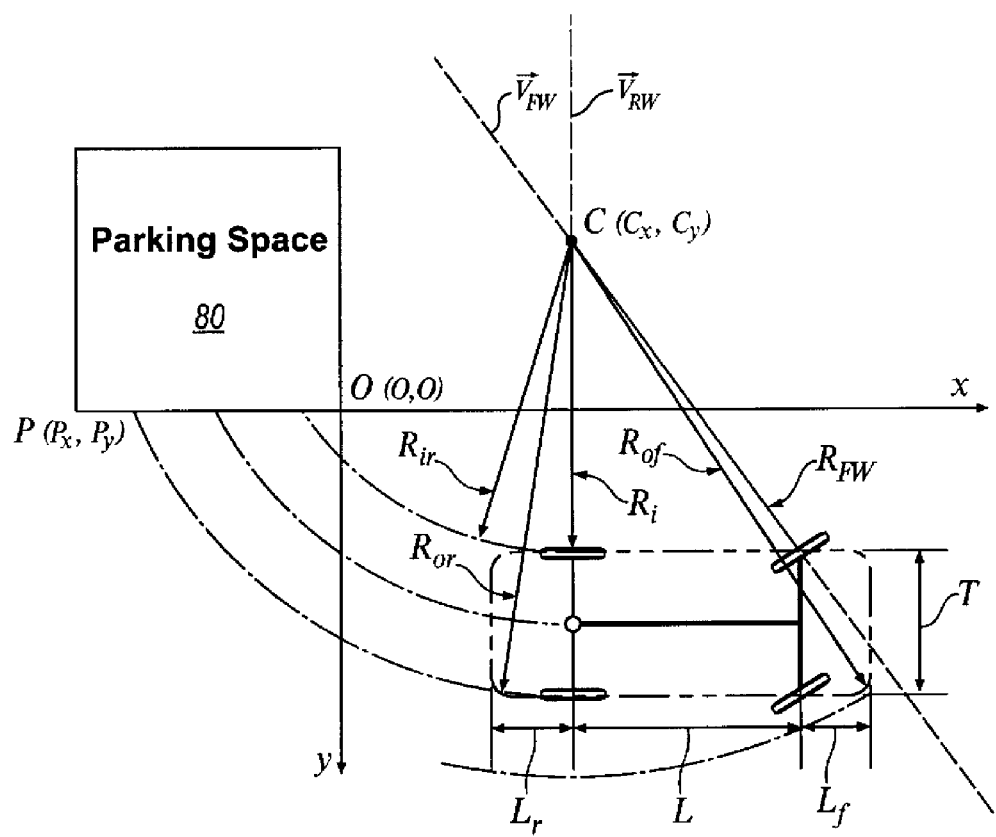
FIGS. 4 and 5 comprise plan views of vehicle operation, in accordance with the present invention.

Referring now to FIGS. 3, and 4 and 5, there are depicted diagrams descriptive of operation of the control scheme for rear parking. The control scheme includes determining a range of rear parking trajectories effective to prevent the vehicle from colliding with objects during a rear parking maneuver. FIG. 3 comprises an algorithmic flowchart 100, preferably machine-executable code stored in control module 30, for determining front wheel steering angle $\delta_f(t)$, steering angle correction, $\Delta\delta_f(t)$ and an AFS angle control command. A depicted in FIG. 4, the parking trajectory is preferably executed with reference to an x-y orthogonal axis. Boundaries for the target parking region 80, e.g., a parking space, are defined and circumscribed by locus O, having coordinates of (0,0) and P, having coordinates (Px, Py), with boundary lines parallel to the y-axis in the positive direction. In operation, the system detects an operator intent to park the vehicle, e.g., in a rear-parking maneuver (Step 102). Detection of operator intent to park the vehicle can be in the form, for example, of an operator input to a user interface in the vehicle, e.g., the parking switch 50 depicted in FIG. 1, and an automatic parking detection based upon the transmission commanded into reverse gear, and operation low vehicle speed, with operator input to the steering wheel. Data are acquired from parking assist sensors 20, 21, 25, and the chassis monitoring sensors 15, including current vehicle speed in x-vector $v_x(t)$, steering angle $\delta_f(t)$, and vehicle yaw rate $\gamma(t)$ (Step 104). The target parking region 80 is computed, along with a current position of the vehicle, referenced to reference point C (Step 106), based upon inputs from the parking assist sensors 20, 21, 25, This is depicted in detail with reference to FIG. 4. When the transmission is commanded to reverse gear (Step 108), minimum and maximum allowable steering angles $\delta_{fmin}(t)$, $\delta_{fmax}(t)$ are computed (Step 110). So long as the operator controls the steering wheel to command a steering angle $\delta_f(t)$ within the minimum and maximum allowable steering angles, there is no steering correction (Step 112). When the operator commands the steering angle outside either the minimum or maximum allowable steering angles (Step 112), a steering angle correction, $\Delta\delta_f(t)$ is determined (Step 114) and an AFS angle control command is generated (Step 116). The AFS system controls vehicle steering to the corrected steering angle. This operation continues so long as the vehicle is in reverse gear, and the operator intent to park continues (Step 118). Data is continually gathered by the sensors (Step 120), and vehicle position is computed (122).

The control scheme described in FIG. 3 includes execution of a plurality of geometric and trigonometric equations to determine the minimum and maximum allowable steering angles $\delta_{fmin}(t)$, $\delta_{fmax}(t)$, depicted in FIG. 4 and derived based upon the following equations. The key ground parameters are identified by the first control module for the boundaries of target parking region 80, comprising locus O, having coordinates of (0,0), locus P, having coordinates (Px, Py), with boundary lines parallel to the y-axis in the positive direction, and a reference point C. The vehicle is described in terms of characteristic parameters, including an overall width T, a wheelbase L, a front length from the front axle to the vehicle front end $L_f$, and a rear length from the rear axle to the vehicle rear end $L_r$.

The reference point C, having orthogonal position (Cx, Cy) relative to the O point, is derived as follows. Vectors $V_{RW}$ (rear wheel) and $V_{FW}$ (front wheel) are determined. Vector $V_{RW}$ comprises a vector extending parallel to the rear axle and passing through the centerline thereof. Vector $V_{FW}$ comprises a vector extending perpendicular to the inside front (steering) wheel, and passing through the centerline thereof. Reference point C is defined and determinable as the intersection of vectors $V_{RW}$ and $V_{FW}$, in this embodiment. Alternatively, the vector $V_{FW}$ can comprise a vector generated based upon both the inside front wheel and the outside front steering wheel. The reference point C can be determined regularly during ongoing operation of the system described.

The system determines four radii, each relative to the reference point C, comprising:

$R_{ir}$: vehicle permissible inside turning radius directed to the rear, inside point of a vehicle body;

$R_{or}$: vehicle permissible outside turning radius directed to the rear, outside point of a vehicle body;

$R_i$: vehicle radius from a nearest vehicle point to reference point C, typically defined along vector $V_{RW}$; and, $R_{of}$: vehicle radius from a furthest vehicle point to reference point C directed to the front, outside point of a vehicle body.

The radii $R_{ir}$, $R_{or}$, $R_i$, and $R_{of}$ are determinable for any vehicle location, steering angle, $\delta_f$, and location O, using Eqs. 1-4:

$$R_i = L/\tan(\delta_f) \quad [1]$$

$$R_{ir} = \sqrt{(L/\tan(\delta_f))^2 + Lr^2} \quad [2]$$

$$R_{or} = \sqrt{(L/\tan(\delta_f) + T)^2 + Lr^2}, \text{ and} \quad [3]$$

$$R_{of} = \sqrt{(L/\tan(\delta_f) + T)^2 + (L+Lf)^2}. \quad [4]$$

The radii $R_i$ and $R_{or}$ are known to have the following limits, described in Eqs. 5 and 6:

$$R_i > \sqrt{Cx^2 + Cy^2}, \text{ and,} \quad [5]$$

$$R_{or} < (Cx - Px). \quad [6]$$

Limits for steering angle, $\delta_f$, i.e., $\delta_{fmin}(t)$, $\delta_{fmax}(t)$, are determined to be as described in Eqs. 7 and 8:

$$\tan^{-1}[L/\sqrt{((Cx-Px)^2 - Lr^2) - T}] = \delta_{fmin}(t) < \delta_f(t) \quad [7]$$

$$\tan^{-1}[L/\sqrt{(Cx^2 + Cy^2)}] = \delta_{fmax}(t) > \delta_f(t). \quad [8]$$

Figure 5A:
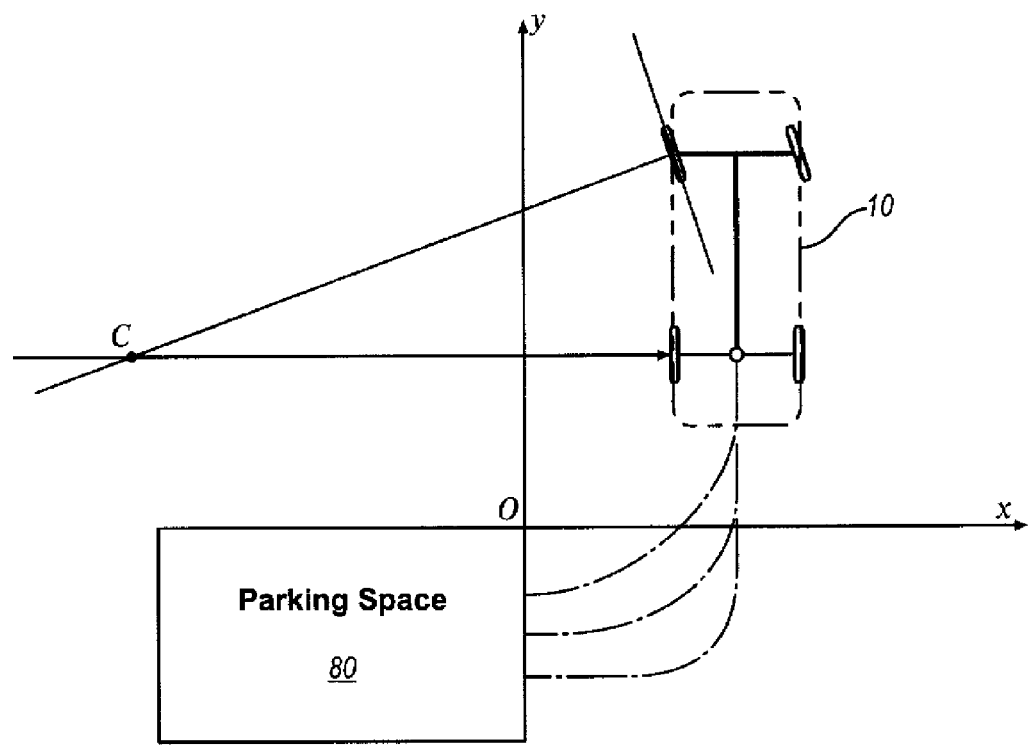
Figure 5B:
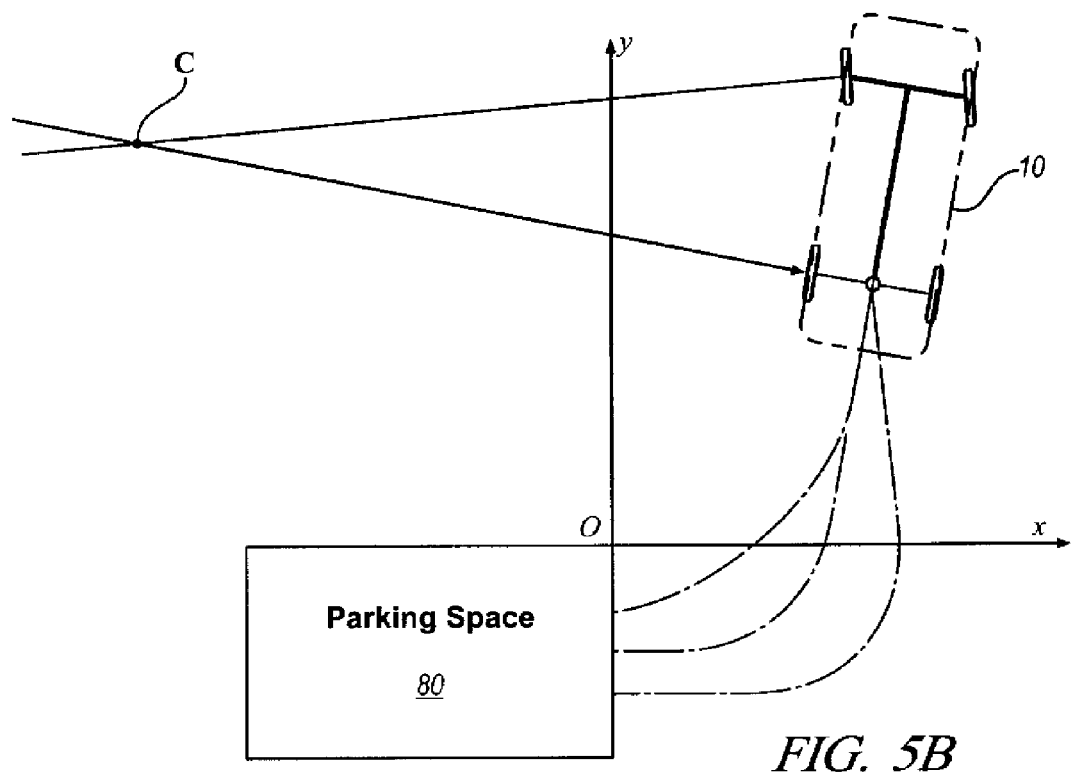

Thus, as depicted in FIGS. 5A and 5B, a range of acceptable trajectories are attainable for parking the vehicle within boundaries of the target parking region 80, with the vehicle initially starting at a position first substantially parallel to the y-axis (FIG. 5A), and, skewed from the y-axis (FIG. 5B).

Figure 6:
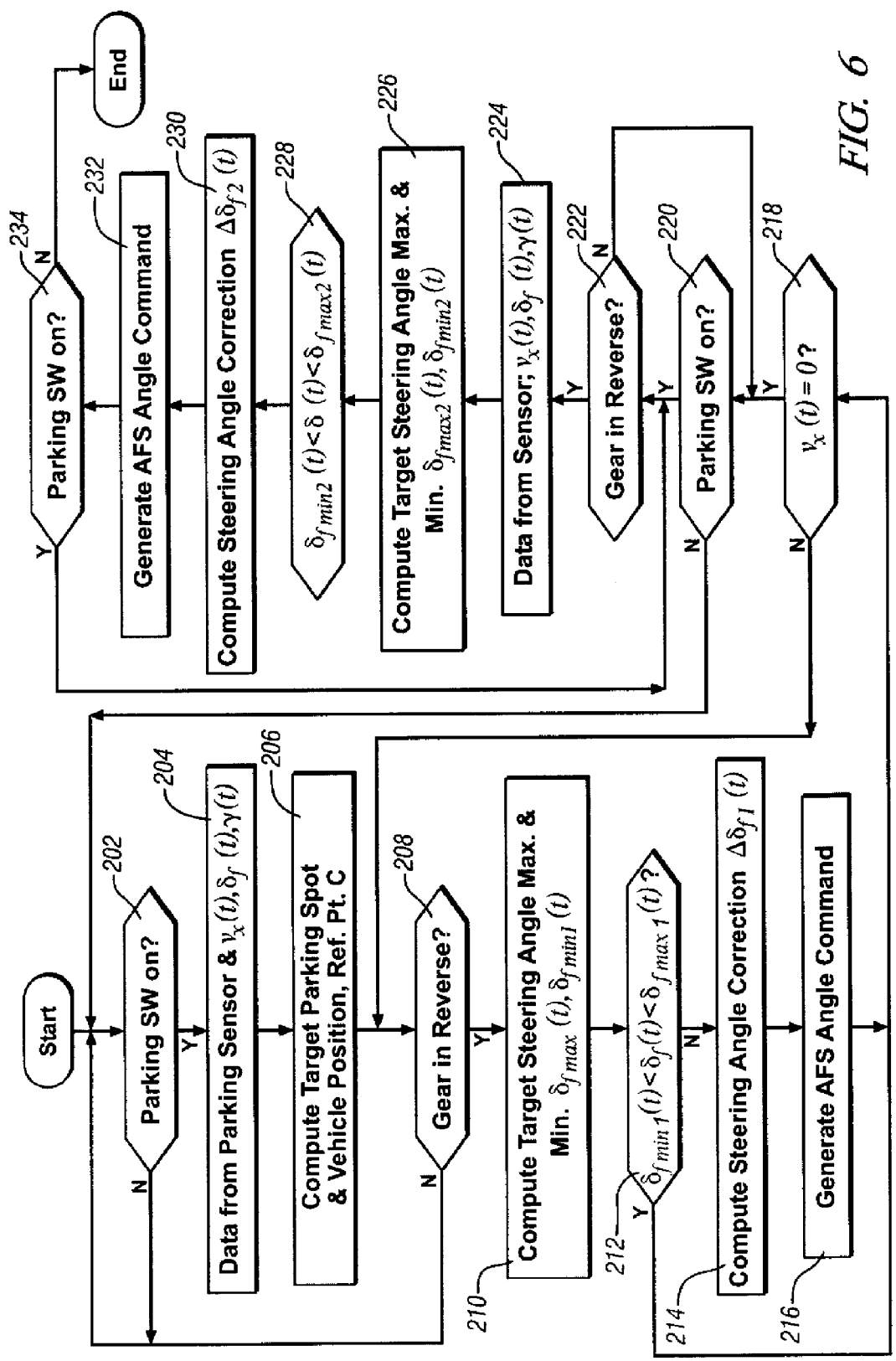
FIG. 6 comprises an algorithmic flowchart, in accordance with the present invention.
Figure 7:
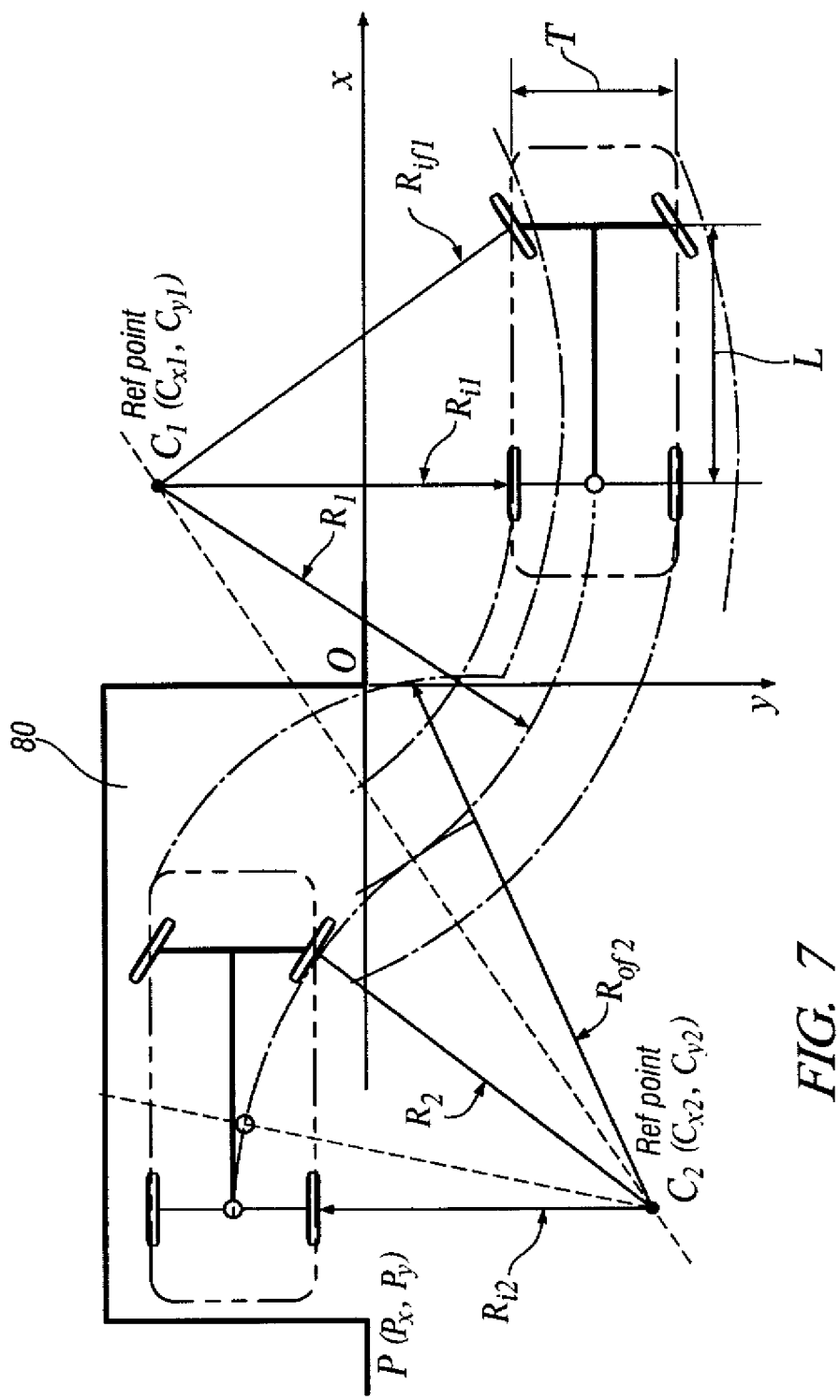
FIGS. 7 and 8 comprise plan views of vehicle operation, in accordance with the present invention; and, FIG. 9 comprises an exemplary system, in accordance with the present invention.

Referring now to FIGS. 6 and 7, there is depicted a schematic diagram for determining a range of parallel parking trajectories effective to prevent the vehicle from colliding with objects, including an algorithmic flowchart for determining steering angles $\delta_{f1}(t)$, $\delta_{f2}(t)$, steering angle corrections $\Delta\delta_{f1}(t)$ and $\Delta\delta_{f2}(t)$ and an AFS angle control command. The parking trajectory is preferably executed with reference to the x-y orthogonal axis. The boundaries of the target parking region 80, in this instance a parallel parking space, are defined and circumscribed by locus O, having coordinates of (0,0) and P, having coordinates (Px, Py), with boundary lines parallel to the y-axis in the positive direction. As previously described, location of the reference point C is dependent upon steering angle. Reference point C is depicted as two reference points, $C_1$ and $C_2$, to better describe operation of the invention. The reference points depicted as C1 and C2 are dependent upon steering angle being C1 positive (left-ward) and C2 negative (right-ward).

Referring again to FIG. 6, the system detects an operator intent to park the vehicle (Step 202), e.g., when the parking switch, 50 is on, and data are acquired from the parking assist sensors 20, 21, 25, and the chassis monitoring sensors 15, including current vehicle speed in x-vector $v_x(t)$, steering wheel angle $\delta_f(t)$, and yaw rate $\gamma(t)$. (Step 204). Boundaries of the target parking region 80 are computed, along with a current position of the vehicle (Step 206). This is depicted in detail with reference to FIG. 7. When the transmission shift lever is placed into reverse gear (Step 208), minimum and maximum allowable first steering wheel angles $\delta_{fmin1}(t)$, $\delta_{fmax1}(t)$ are computed (Step 210). So long as the operator controls the steering wheel within the maximum and minimum allowable steering wheel angles, there is no steering correction. When the operator commands the steering wheel outside either the maximum or minimum allowable steering wheel angles (Step 212), a first steering angle correction, $\Delta\delta_{f1}(t)$ is determined (Step 214) and an AFS angle control command is generated (Step 216). This operation continues so long as the vehicle is moving as indicated by vehicle speed (Step 218), there is an intent to park (Step 220), the vehicle is in reverse gear (Step 222), and the operator steering wheel input has not indicated a change in steering direction from a first direction (e.g., clockwise or positive) to a second direction (e.g., counterclockwise or negative). Data are continually gathered by the sensors.

When there is detected a change from the first direction of steering wheel angle to the second direction $\delta_{f2}(t)$ of steering wheel angle (Step 224), data are gathered from sensors and vehicle position is computed. Minimum and maximum allowable second steering angles $\delta_{fmin2}(t)$, $\delta_{fmax2}(t)$ are computed (Step 226). So long as the operator controls the steering wheel within the maximum and minimum allowable steering angles in the direction of steering, there is no steering correction. When the operator commands the steering wheel outside either the maximum or minimum allowable steering wheel angles (Step 228), a second steering angle correction, $\Delta\delta_{f2}(t)$ is determined (Step 230) and an AFS angle control command is generated (Step 232), both originating from reference point C2. This operation continues so long as there is an intent to park and the vehicle remains in reverse gear (Step 234).

The control scheme described in FIG. 6 executes geometric and trigonometric equations to effective to determine minimum and maximum allowable steering angles $\delta_{fmin2}(t)$, $\delta_{fmax2}(t)$ which are depicted in FIG. 7 and derived based upon previously described Eq. 1-4 and the following conditions. The key boundaries are identified by the first control module for the allowable parallel parking space 80, again comprising locus O, having coordinates of (0, 0) and P, having coordinates $(P_x, P_y)$, with boundary lines parallel to the y-axis in the positive direction, and reference points comprising depicted as either one of C1 and C2, dependent upon steering angle being positive (left-ward) or negative (right-ward). The vehicle is again described in terms of characteristic parameters, including an overall width T, a wheelbase L, front length from the front axle to the vehicle front end $L_f$, and rear length from the rear axle to the vehicle rear end $L_r$. The system determines the reference point, either of C1 at position $(C_{x1}, C_{y1})$ and C2 at position $(C_{x2}, C_{y2})$. Derivations of the radii are detailed in Eqs. 9-12.

$$R_{i2} = L/\tan(\delta_{f2}); \qquad [9]$$

$$R_{of2} = \sqrt{(L/\tan(\delta_{f2})+T)^2 + (L+L_f)^2}; \qquad [10]$$

$$R_{i1} = L/\tan(\delta_{f1}); \text{ and,} \qquad [11]$$

$$R_{or1} = \sqrt{(L/\tan(\delta_{f})+T)^2 + L_r^2}. \qquad [12]$$

The radii $R_{i2}$ and $R_{of2}$ are known to have the following limits, described in Eqs. 13 and 14:

$$R_{of2} < \sqrt{C_{x2}^2 + C_{y2}^2}, \text{ and,} \qquad [13]$$

$$R_{i2} < C_{y2}. \qquad [14]$$

Limits for steering angle, $\delta_{f2}$, i.e., $\delta_{fmin2}(t)$, $\delta_{fmax2}(t)$, are determined as described in Eqs. 15 and 16:

$$\tan^{-1}[2LT/((P_x+L_T)^2 - T^2 - (L+L_f)^2)] = \delta_{fmin2}(t) < \delta_{f2}(t) \qquad [15]$$

$$\tan^{-1}[L/C_{y2}] = \delta_{fmax2}(t) > \delta_{f2}(t). \qquad [16]$$

The limits on steering angle, $\delta_{f2}$ are translated to the limits on steering angle, $\delta_{f1}$ using Eq. 17:

$$R_{if1} + R_{if2} + T = \sqrt{(C_{x1} - C_{x2}T)^2 + (C_{y1} - C_{y2})^2} \qquad [17]$$

The additional limits for steering angle, $\delta_{f1}$ are determined using Eqs. 7 and 8. Limits for steering angle, $\delta_{f1}$ are the limits satisfying all the conditions listed above. After the steering angle transition stage, limits on steering angle, $\delta_{f2}$ are only based on Eqs. 15 and 16.

Furthermore, the first control module is continually monitoring and updating the allowable parking space geometry. Therefore, if a new object is detected during the parking maneuver, the control system accommodates it.

The first and second reference points C1 and C2, are defined to have orthogonal positions $(C_{x1}, C_{y1})$ and $(C_{x2}, C_{y2})$ relative to the O point. The reference point is derived as previously described from the radii $R_{ir}$, $R_{or}$, $R_i$, $R_{of}$ and determinable for any vehicle location, steering wheel angle, $\delta_f$, location O and the respective reference point C1 or C2. The reference point is determined regularly during ongoing operation of the system described, as previously described using Eqs. 1-17.

Figure 8A:
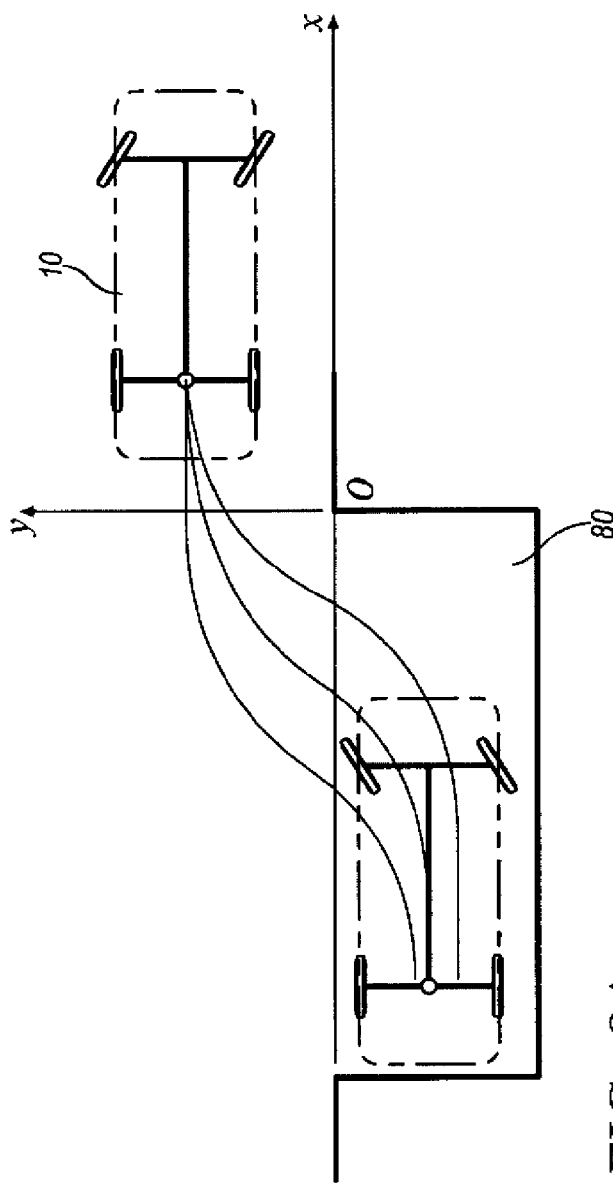
Figure 8B:
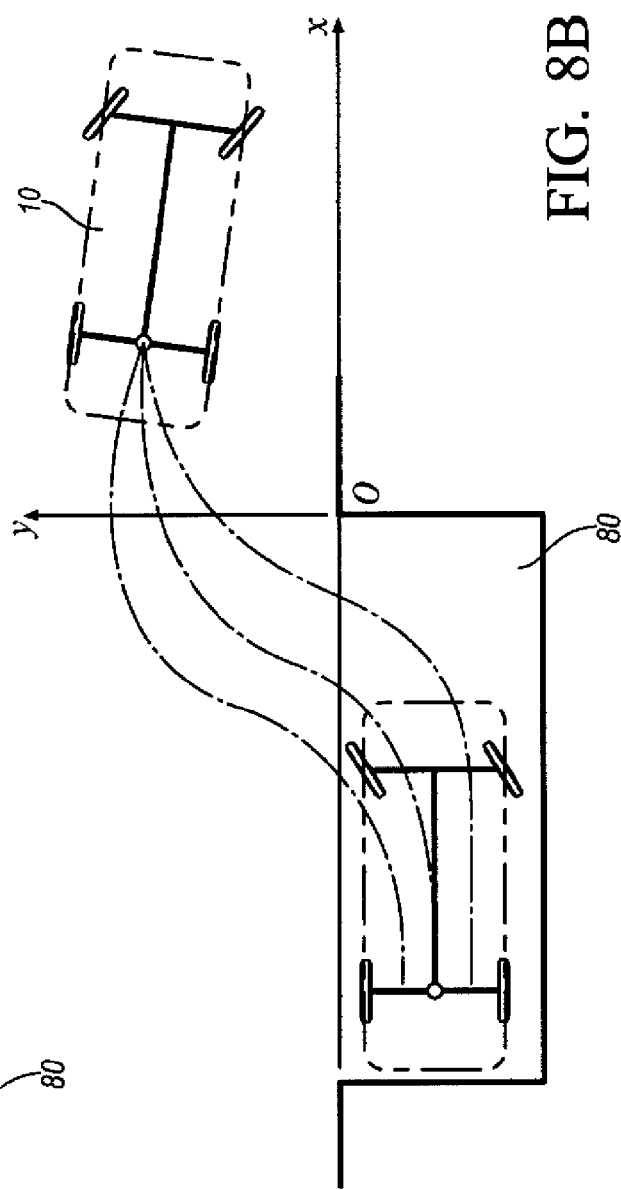

Thus, as depicted in FIGS. 8A and 8B, a range of acceptable trajectories are attainable for parking the vehicle within boundaries of the target parking region 80, with the vehicle initially starting at a position first parallel to the y-axis, and, skewed from the y-axis.

Figure 9:
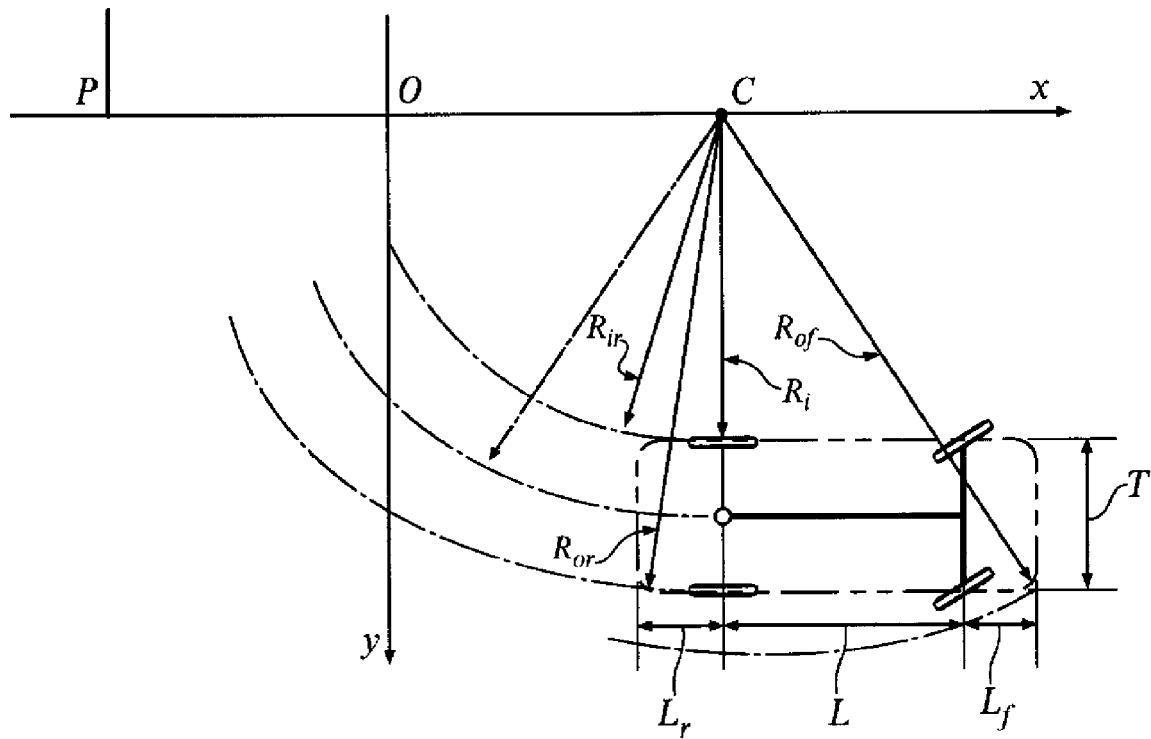

Referring now to FIG. 9, operation of calculations for the rear parking system described herein is depicted for an exemplary vehicle to illustrate the system. The exemplary vehicle has an overall length of 4.864 m, comprising a wheelbase L=2.885 m, a front length from the front axle to the vehicle front end $L_f$=0.920 m, and a rear length from the rear axle to the vehicle rear end $L_r$=1.059 m, and an overall width T=1.650 m. With P having a locus of (−3.5 m, 0), and C having a locus of (6.5 m, 0), allowable steering angle $\delta_f(t)$ is circumscribed as follows: 23.93°>$\delta_f(t)$>19.18°. The algorithm only actively assists the operator in parking the vehicle through control of steering wheel angle when the operator input to the steering wheel falls outside the range defined.

The invention has been described with specific reference to the embodiments and modifications thereto. Further modifications and alterations may occur to others upon reading and understanding the specification. It is intended to include all such modifications and alterations insofar as they come within the scope of the invention.

Having thus described the invention, it is claimed:

1. Method to assist steering of a vehicle equipped with an active steering system when operating in a reverse direction, comprising:
   monitoring vehicle operating characteristics and an operator steering input;
   determining boundaries of a target region;
   determining a reference point;
   calculating a target steering angle range corresponding to the reference point and the target region;
   determining a steering angle correction when the operator steering input is outside the target steering angle range; and
   controlling the active steering system in response to the steering angle correction.

2. The method of claim 1, wherein determining the reference point comprises determining a point of intersection of a first vector and a second vector, the first vector parallel to and passing through a centerline of a rear axle of the vehicle and the second vector perpendicular to and passing through a centerline of an inside front steerable wheel of the vehicle.

3. The method of claim 1, wherein determining the reference point comprises determining a point of intersection of a first vector and a second vector, the first vector parallel to and passing through a centerline of an inside rear steerable wheel of the vehicle and the second vector perpendicular to and passing through a centerline of an inside front steerable wheel of the vehicle.

4. The method of claim 1, wherein monitoring vehicle operating characteristics comprises monitoring a steering angle, vehicle speed, and yaw rate.

5. The method of claim 1, wherein the boundaries of the target region comprise geometrically defined locations identifiable using on-vehicle location detectors.

6. The method of claim 5, wherein the target region is identified based upon detection of an operator intent to park the vehicle.

7. The method of claim 5, wherein the target region is identified based upon detection of an operator intent to park the vehicle comprising an operator command to operate the vehicle in a reverse direction.

8. The method of claim 1, wherein calculating a target steering angle range corresponding to the reference point and the target region comprises:
   determining a plurality of radii corresponding to the reference point and the vehicle; and,
   calculating the target steering angle range to prevent vehicle interference with the boundaries of the target region during movement of the vehicle toward the target region.

9. The method of claim 8, wherein the plurality of radii comprise a permissible inside turning radius, a permissible outside turning radius, an inside vehicle radius, and, an outside vehicle radius.

10. Method to assist parking of a vehicle equipped with an active steering system, comprising:
    detecting an operator intent to park a vehicle;
    monitoring vehicle operating characteristics and an operator steering input;
    determining boundaries of a target region;
    determining a reference point;
    calculating a target steering angle range corresponding to the reference point and the target region;
    determining a steering angle correction; and
    controlling the active steering system in response to the steering angle correction only when the operator steering input is outside the target steering angle range.

11. The method of claim 10, wherein determining the reference point comprises determining a point of intersection of a first vector and a second vector, the first vector parallel to and passing through a centerline of a rear axle of the vehicle and the second vector perpendicular to and passing through a centerline of an inside front steerable wheel of the vehicle.

12. The method of claim 10, wherein detecting an operator intent to park a vehicle comprises detecting an operator input to an interactive notification system including a parking switch.

13. The method of claim 10, wherein detecting an operator intent to park a vehicle comprises detecting an operator command to operate the vehicle in a reverse direction.

14. Vehicle, comprising:
    an active steering system;
    a sensing system configured to identify boundaries of a target region;
    a sensing system configured to monitor vehicle operation; and,
    a control module containing machine-executable code operative to assist vehicle steering when operating in a reverse direction, comprising:
       code to monitor vehicle operating characteristics and an operator steering input;
       code to determine the boundaries of the target region;
       code to determine a reference point;
       code to calculate a target steering angle range corresponding to the reference point and the target region;
       code to determine a steering angle correction when the operator steering input is outside the target steering angle range; and
       code to control the active steering system in response to the steering angle correction.

15. The vehicle of claim 14, wherein the active steering system is configured to control steering angles of front and rear wheels of the vehicle.

* * * * *